United States Patent
Lin et al.

(10) Patent No.: US 10,194,170 B2
(45) Date of Patent: Jan. 29, 2019

(54) METHOD AND APPARATUS FOR VIDEO CODING USING FILTER COEFFICIENTS DETERMINED BASED ON PIXEL PROJECTION PHASE

(71) Applicant: MEDIATEK INC., Hsinchu (TW)

(72) Inventors: Jian-Liang Lin, Yilan County (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 87 days.

(21) Appl. No.: 15/354,435

(22) Filed: Nov. 17, 2016

(65) Prior Publication Data

US 2017/0150180 A1    May 25, 2017

Related U.S. Application Data

(60) Provisional application No. 62/257,756, filed on Nov. 20, 2015.

(51) Int. Cl.
*H04N 19/11*    (2014.01)
*H04N 19/105*    (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS 7,835,440 B2    11/2010    Chono et al.
8,767,830 B2    7/2014    Zhao et al.
(Continued)

FOREIGN PATENT DOCUMENTS

| CN | 1625902 A | 6/2005 |
|---|---|---|
| CN | 1794821 A | 6/2006 |
| CN | 103026707 A | 4/2013 |

OTHER PUBLICATIONS

International Search Report and Written Opinion of the International Searching Authority dated Mar. 2, 2017 in PCT/CN2016/106592 filing Nov. 21, 2016.

*Primary Examiner* — Michael J Hess
(74) *Attorney, Agent, or Firm* — Oblon, McClelland, Maier & Neustadt, L.L.P.

(57) ABSTRACT

Aspects of the disclosure provide a method for video coding. The method includes receiving input data associated with a processing block in a current picture, selecting, from a set of neighboring reconstructed samples for intra-coding pixels in the processing block, a plurality of reference samples for a pixel in the processing block based on a position of the pixel and an intra prediction mode of the processing block, determining a projection phase for the pixel based on the position of the pixel and the intra prediction mode of the processing block, determining coefficients of an interpolation filter based on the projection phase for the pixel, applying the interpolation filter with the determined coefficients on the reference samples to generate a prediction of the pixel, and encoding or decoding the pixel in the processing block using the prediction of the pixel.

18 Claims, 8 Drawing Sheets

(51) Int. Cl.
    *H04N 19/59*         (2014.01)
    *H04N 19/80*         (2014.01)
    *H04N 19/593*       (2014.01)
    *H04N 19/159*       (2014.01)
    *H04N 19/46*         (2014.01)
    *H04N 19/635*       (2014.01)
    *H04N 19/174*       (2014.01)
    *H04N 19/176*       (2014.01)
    *H04N 19/182*       (2014.01)

(52) U.S. Cl.
    CPC ........... *H04N 19/159* (2014.11); *H04N 19/46* (2014.11); *H04N 19/59* (2014.11); *H04N 19/635* (2014.11); *H04N 19/80* (2014.11); *H04N 19/174* (2014.11); *H04N 19/176* (2014.11); *H04N 19/182* (2014.11)

(56) References Cited

U.S. PATENT DOCUMENTS

| | | |
|---|---|---|
| 9,241,160 B2 | 1/2016 | He et al. |
| 2005/0105617 A1 | 5/2005 | Chono et al. |
| 2008/0063062 A1 | 3/2008 | Zhao et al. |
| 2008/0267289 A1 | 10/2008 | Yu et al. |
| 2012/0183041 A1* | 7/2012 | Maani ................... H04N 19/176 375/240.02 |
| 2013/0121416 A1 | 5/2013 | He et al. |
| 2014/0016874 A1* | 1/2014 | Francois ................. G06T 9/004 382/236 |
| 2014/0185680 A1* | 7/2014 | Li ......................... H04N 19/597 375/240.16 |
| 2015/0063457 A1* | 3/2015 | Gamei ................. H04N 19/122 375/240.16 |
| 2016/0300367 A1* | 10/2016 | Nakanishi ............. G06T 11/005 |

\* cited by examiner

Int Lanczos4TapCoeffs[32][4]=

| { | 0,   | 1024, | 0,    | 0   | } |
|---|------|-------|-------|-----|---|
| { | -19, | 1022, | 22,   | 0   | } |
| { | -36, | 1015, | 46,   | -1  | } |
| { | -50, | 1004, | 72,   | -2  | } |
| { | -61, | 988,  | 101,  | -4  | } |
| { | -71, | 969,  | 133,  | -7  | } |
| { | -78, | 946,  | 166,  | -10 | } |
| { | -83, | 919,  | 201,  | -14 | } |
| { | -86, | 889,  | 239,  | -18 | } |
| { | -87, | 857,  | 277,  | -23 | } |
| { | -87, | 822,  | 318,  | -28 | } |
| { | -86, | 784,  | 359,  | -34 | } |
| { | -83, | 745,  | 401,  | -40 | } |
| { | -79, | 704,  | 445,  | -46 | } |
| { | -75, | 662,  | 488,  | -52 | } |
| { | -70, | 620,  | 532,  | -58 | } |
| { | -64, | 576,  | 576,  | -64 | } |
| { | -58, | 532,  | 620,  | -70 | } |
| { | -52, | 488,  | 662,  | -75 | } |
| { | -46, | 445,  | 704,  | -79 | } |
| { | -40, | 401,  | 745,  | -83 | } |
| { | -34, | 359,  | 784,  | -86 | } |
| { | -28, | 318,  | 822,  | -87 | } |
| { | -23, | 277,  | 857,  | -87 | } |
| { | -18, | 239,  | 889,  | -86 | } |
| { | -14, | 201,  | 919,  | -83 | } |
| { | -10, | 166,  | 946,  | -78 | } |
| { | -7,  | 133,  | 969,  | -71 | } |
| { | -4,  | 101,  | 988,  | -61 | } |
| { | -2,  | 72,   | 1004, | -50 | } |
| { | -1,  | 46,   | 1015, | -36 | } |
| { | 0,   | 22,   | 1022, | -19 | } |

FIG. 7

```
Int g_aiIntraLanczFilter[32][4]=
```

| { | 0,   | 256, | 0,   | 0   | } |
|---|------|------|------|-----|---|
| { | -4,  | 254, | 7,   | -1  | } |
| { | -7,  | 251, | 14,  | -2  | } |
| { | -10, | 247, | 22,  | -3  | } |
| { | -12, | 242, | 29,  | -3  | } |
| { | -14, | 236, | 39,  | -5  | } |
| { | -16, | 230, | 48,  | -6  | } |
| { | -17, | 224, | 55,  | -6  | } |
| { | -18, | 216, | 66,  | -8  | } |
| { | -19, | 209, | 75,  | -9  | } |
| { | -19, | 200, | 85,  | -10 | } |
| { | -19, | 192, | 94,  | -11 | } |
| { | -19, | 183, | 104, | -12 | } |
| { | -18, | 173, | 114, | -13 | } |
| { | -18, | 164, | 124, | -14 | } |
| { | -17, | 154, | 135, | -16 | } |
| { | -16, | 144, | 144, | -16 | } |
| { | -16, | 135, | 154, | -17 | } |
| { | -14, | 124, | 164, | -18 | } |
| { | -13, | 114, | 173, | -18 | } |
| { | -12, | 104, | 183, | -19 | } |
| { | -11, | 94,  | 192, | -19 | } |
| { | -10, | 85,  | 200, | -19 | } |
| { | -9,  | 75,  | 209, | -19 | } |
| { | -8,  | 66,  | 216, | -18 | } |
| { | -6,  | 55,  | 224, | -17 | } |
| { | -6,  | 48,  | 230, | -16 | } |
| { | -5,  | 39,  | 236, | -14 | } |
| { | -3,  | 29,  | 242, | -12 | } |
| { | -3,  | 22,  | 247, | -10 | } |
| { | -2,  | 14,  | 251, | -7  | } |
| { | -1,  | 7,   | 254, | -4  | } |

Rows 1–17: STORED
Rows 18–32: NOT STORED

*FIG. 8*

METHOD AND APPARATUS FOR VIDEO CODING USING FILTER COEFFICIENTS DETERMINED BASED ON PIXEL PROJECTION PHASE

INCORPORATION BY REFERENCE

This present disclosure claims the benefit of U.S. Provisional Application No. 62/257,756, "Methods to derive the Intra Reference Sample for Video Coding" filed on Nov. 20, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding standards, such as high efficiency video coding (HEVC) standard, and the like, use video compression technologies to improve coding efficiency and improve video quality. In an example, redundant portions in frames are replaced with a short description instead of the original pixels to improve coding efficiency. When the redundant portions are within a single frame, intra prediction technology can be used for encoding/decoding. When the redundant portions are in subsequent frames, inter prediction technology can be used for encoding/decoding.

SUMMARY

Aspects of the disclosure provide a method for video coding. The method includes receiving input data associated with a processing block in a current picture, selecting, from a set of neighboring reconstructed samples for intra-coding pixels in the processing block, a plurality of reference samples for a pixel in the processing block based on a position of the pixel and an intra prediction mode of the processing block, determining a projection phase for the pixel based on the position of the pixel and the intra prediction mode of the processing block, determining coefficients of an interpolation filter based on the projection phase for the pixel, applying the interpolation filter with the determined coefficients on the selected reference samples to generate a prediction of the pixel, and encoding or decoding the pixel in the processing block using the prediction of the pixel.

In an embodiment, the method includes determining the interpolation filter from a plurality of filters including one or more Lanczos interpolation filters and at least one other interpolation filter. In an example, said one or more Lanczos filters comprises one or a combination of a 2-tap Lanczos filter, a 4-tap Lanczos filter, and a 6-tap Lanczos filter, and said at least one other interpolation filter comprises a bilinear filter, a cubic filter, or a Gaussian filter.

To determine the interpolation filter from the plurality of filters, in an embodiment, the method includes selecting one of the plurality of filters based on at least one of a size of the processing block and a depth of a quadtree partition. In an example, one of said one or more Lanczos interpolation filters is selected from the plurality of filters when a height or width of the processing block is smaller than a predetermined value. In another embodiment, the method includes selecting one of the plurality of filters based on a flag incorporated in a bit stream. In an example, the flag is transmitted in sequence, view, picture, slice, or block level.

In another embodiment, the method includes selecting one of the plurality of filters based on statistics of intra coded blocks in the current picture and one or more previous coding pictures.

Further, in an embodiment, the method includes when any reference sample is not available, obtaining an alternative sample to replace the unavailable reference sample. In another embodiment, the method includes determining the interpolation filter based on an availability of the reference samples.

Aspects of the disclosure provide an apparatus that includes a processing circuit. The processing circuit is configured to receive input data associated with a processing block in a current picture, select, from a set of neighboring reconstructed samples for intra-coding pixels in the processing block, a plurality of reference samples for a pixel in the processing block based on a position of the pixel and an intra prediction mode of the processing block, determine a projection phase for the pixel based on the position of the pixel and the intra prediction mode of the processing block, determine coefficients of an interpolation filter based on the projection phase for the pixel, apply the selected interpolation filter with the determined coefficients on the selected reference samples to generate a prediction of the pixel, and encode/decode the pixel in the processing block using the prediction of the pixel.

BRIEF DESCRIPTION OF THE DRAWINGS

Various embodiments of this disclosure that are proposed as examples will be described in detail with reference to the following figures, wherein like numerals reference like elements, and wherein:

FIG. 7 shows a table of coefficients in association with projection phases for a 4-tap Lanczos filter; and FIG. 8 shows another table of coefficients in association with projection phases for a 4-tap Lanczos filter.

DETAILED DESCRIPTION OF EMBODIMENTS

Figure 1:
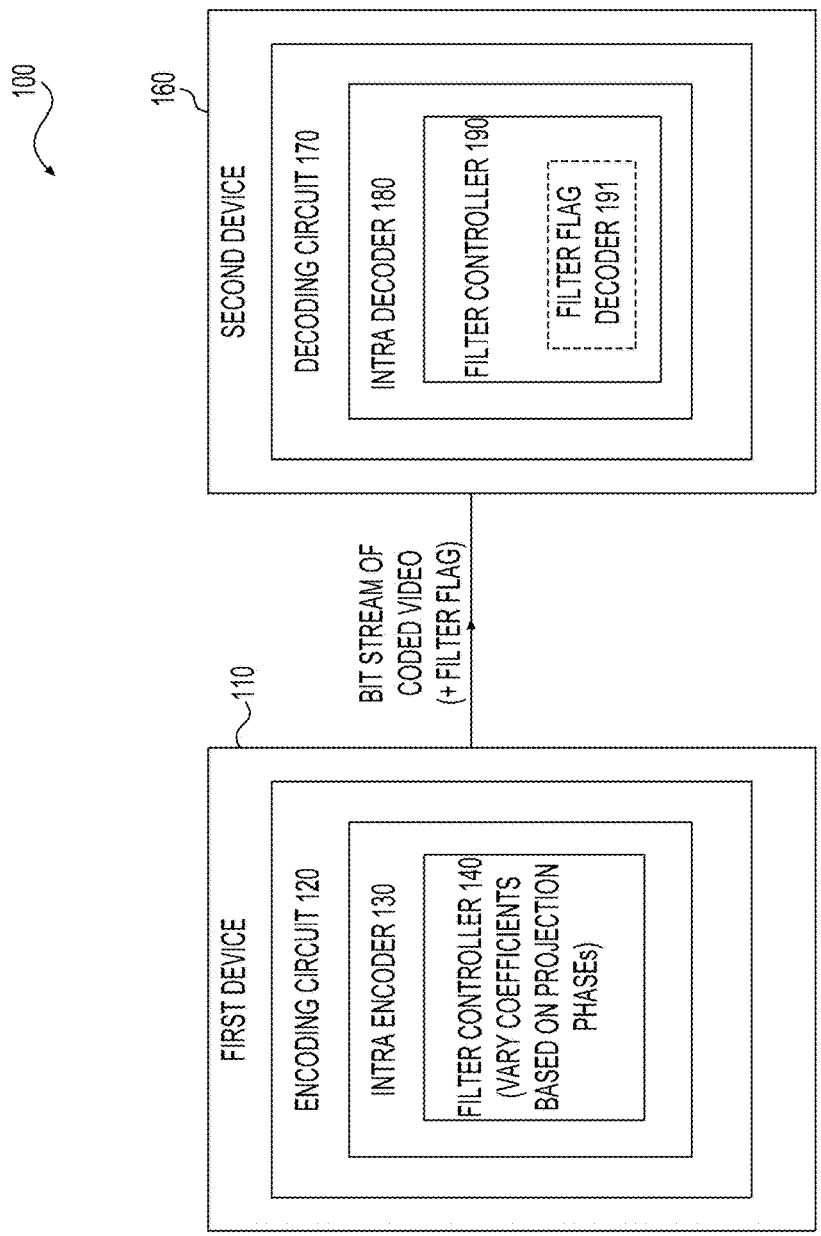
FIG. 1 shows a diagram of an electronic system 100 according to an embodiment of the disclosure.

FIG. 1 shows a diagram of an electronic system 100 according to an embodiment of the disclosure. The electronic system 100 includes a plurality of electronic devices that use various coding (encoding/decoding) techniques, such as inter prediction coding techniques, intra prediction coding techniques, and the like, to efficiently deliver video among the plurality of electronic devices. In the FIG. 1 example, the electronic system 100 includes a first device 110 and a second device 160, and video is coded and the coded video is transmitted in a bit stream between the first device 110 and the second device 160. According to an aspect of the disclosure, one of the intra prediction coding techniques uses an interpolation filter to improve coding efficiency and improve video quality. The interpolation filter uses projection phase dependent coefficients to improve prediction quality. In an embodiment, the interpolation filter is a Lanczos filter.

According to an aspect of the disclosure, the plurality of electronic devices in the electronic system 100 can be any suitable devices. In an example, the first device 110 is multi-media capture device, such as a video recorder, a camera, a smart phone, a tablet computer, a laptop computer, a desktop computer, and the like configured to generate video frames and encode the video frames into coded video; and the second device 160 is a multi-media play device, such as a television, a projector, a smart phone, a tablet computer, a laptop computer, a desktop computer and the like configured to decode the coded video to construct decoded video frames and display the decoded video frames.

In another example, the first device 110 is coupled to a multi-media capture device (not shown) that generates video frames, and the first device 110 receives the video frames from the multi-media capture device and encodes the video frames. In another example, the second device 160 is coupled to a multi-media play device (not shown), and the second device 160 decodes the coded video to construct the decoded video frames and provides the decoded video frames to the multi-media play device for play.

In the FIG. 1 example, the first device 110 transmits the coded video in a bit stream to the second device 160 via any suitable communication channel according to one or more communication standards, such as a cable, a local area network (LAN), a wireless LAN (WLAN), a cellular network, an optical network, Internet, or any combination of the above. In an example, the bit stream is carried in electrical signals and transmitted via a cable. In another example, the bit stream is carried in packets, and the packets are transmitted by electrical signals in an LAN. In another example, the packets can be carried by radio frequency signals, for example, in a WLAN, or a cellular network.

According to an aspect of the disclosure, the first device 110 includes an encoding circuit 120 configured to encode video according to a video coding standard, such as a high efficiency video coding (HEVC) standard, and generate the bit stream of coded video. The bit stream is transmitted by the first device 110 and/or other devices (not shown) in any suitable format. The second device 160 includes a decoding circuit 170 configured to receive a bit stream of coded video, and decode the bit stream to generate the decoded video frames according to a video coding standard, such as the HEVC standard.

Further, the encoding circuit 120 and the decoding circuit 170 use one or more interpolation filters during encoding and/or decoding. For example, the encoding circuit 120 includes an intra encoder 130 configured to determine spatial redundancy, such as correlation among pixels, within a single video frame, and uses a short description of the spatial redundancy instead of the original pixels to improve coding efficiency. During intra encoding, the intra encoder 130 uses one or more interpolation filters to generate intra predictions for pixels. For example, a pixel in the block is projected to samples in a reference row or column according to the direction of the associated intra prediction mode, and then an interpolation filter is applied on the projected samples to calculate a prediction for the pixel. In an embodiment, the intra encoder 130 includes a filter controller 140 configured to determine coefficients of the interpolation filter. In an example, the filter controller 140 is configured to vary filter coefficients based on projection phases.

Similarly, in an example, the decoding circuit 170 includes an intra decoder 180. During intra decoding, the intra decoder 180 uses one or more interpolation filters to generate intra predictions for pixels. In an embodiment, the intra decoder 180 includes a filter controller 190 configured to determine coefficients of an interpolation filter. In an example, the filter controller 190 is configured to vary filter coefficients based on a projection phase.

In an example, the interpolation filter is a Lanczos filter, such as a 2-tap Lanczos filter, a 4-tap Lanczos filter, a 6-tap Lanczos filter and the like. The Lanczos filter is a non-linear low-pass filter used to smoothly interpolate values of a digital signal among samples. For example, the Lanczos filter maps samples of the digital signal to a translated and scaled copy of a Lanczos kernel that is a sine function windowed by the central lobe of a second longer sine function. The sum of the translated and scaled kernels is then evaluated at the desired points. Alternatively, the interpolation filter can be a bi-linear filter, a cubic filter, or a Gaussian filter.

According to an aspect of the disclosure, the filter controller 140 can select an interpolation filter from a plurality of filters, such as a set of a 2-tap Lanczos filter, a 4-tap Lanczos filter, a 6-tap Lanczos filter, a bi-linear filter, a cubic interpolation filter and a Gaussian interpolation filter. Then, the filter controller 140 can determine coefficients of the selected interpolation filter based on the projection phase. At the decoding side, the filter controller 190 can suitably determine the interpolation filter that is selected by the encoding side, and use the same interpolation filter to predict pixels.

It is noted that various techniques can be used to ensure the same interpolation filter is used in the encoding side and decoding side. In an example, the interpolation filter is selected from the plurality of filters based on an intrinsic block characteristic for a partition block (e.g., a processing block, PB, CB, CTB), such as a size of a partition block, a depth of a quadtree partition associated with the processing block, a partition depth associated with the processing block, a height of a partition block, a width of a partition block and the like. For instance, when a height or width of the processing block is smaller than a predetermined value (e.g., 8), the Lanczos interpolation filter is selected. Otherwise, a Gaussian interpolation filter is selected. Alternatively, when the sum of the height and width of the processing block is smaller than a predetermined value, the Lanczos interpolation filter is selected. Otherwise, a Gaussian interpolation filter is selected. In another example, the interpolation filter is selected from the plurality of filters based on statistics of intra coded blocks (e.g., blocks of intra prediction type) in the current picture and one or more previous coding pictures.

In another example, a filter flag that is indicative of the interpolation filter selected at the encoding side for a block is included in the bit stream, thus when the bit stream is received at the decoding side, the filter controller 190 can determine the interpolation filter based on the filter flag. In the FIG. 1 example, the filter controller 190 can include a filter flag decoder 191 configured to decode the filter flag to determine the interpolation filter used at the encoding side.

It is noted that filter flags can be included in the bit stream at various levels, such as a sequence level, a view level, a picture level, a slice level, a block level (e.g., a coding tree block level, a coding block level, a prediction block level, a transform block level), and the like. In one example, the filter flags can be included in SPS (Sequence Parameter Set), VPS (Video Parameter Set), APS (Adaptation Parameter Set), PPS (Picture Parameter Set), and the like.

In an embodiment, prediction is performed in the unit of blocks. For example, according to HEVC standard, a picture frame in a sequence of video frames is partitioned into coding tree units (CTU) for compression, the CTUs in a picture frame have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type, an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values e.g., luma values) for pixels, such as 8×8 pixels, 16×16 pixels, 8×16 pixels, 16×8 pixels and the like.

In the example, when a processing block (e.g., PB) is coded or to be coded by intra prediction, one out of multiple intra prediction modes is selected for representing an estimation of the spatial redundancy. The selected mode and other suitable information are used as a description of the processing block to replace, for example, the original pixel data to improve coding efficiency. In an example, 35 modes are used as estimations of various spatial redundancy characteristics. The 35 modes include 33 directional prediction modes, a DC mode and a planer mode. In an example, each mode has an associated displacement parameter d and a projection direction, the displacement parameter d describes the tangent of the prediction direction in units of $\frac{1}{32}$ samples and having a value from −32 to +32.

According to an aspect of the disclosure, during an intra prediction (e.g., for encoding or for decoding), a plurality of neighboring reconstructed samples in the neighbor reconstructed blocks are determined and used in association with the mode of the processing block to predict values of the pixels in the processing block. For a pixel in the processing block, based on position of the pixel, the pixel is projected to the neighboring reconstructed row or column according to, for example, the projection direction and the displacement parameter to select reference samples, and determine a projection phase (fractional pixel to the reference samples). Further, the filter controller 140 (for encoding) or the filter controller 190 (for decoding) determines coefficients of an interpolation filter corresponding to the reference samples based on the projection phase. Then, the interpolation filter with the determined coefficients is applied on the reference samples to predict a value of the pixel. A detail example of intra prediction is described with reference to FIG. 2.

It is noted that the encoding circuit 120 and the decoding circuit 170 can be implemented using any suitable technique. In an embodiment, the encoding circuit 120 and the decoding circuit 170 is implemented using integrated circuit. In another example, the encoding circuit 120 and the decoding circuit 170 are implemented using a processing circuit (e.g., a processor) executing software instructions.

It is also noted that the first device 110 and the second device 160 can include other suitable components. For example, the first device 110 can include a decoding circuit (not shown), and the second device 160 can include an encoding circuit (not shown).

Figure 2:
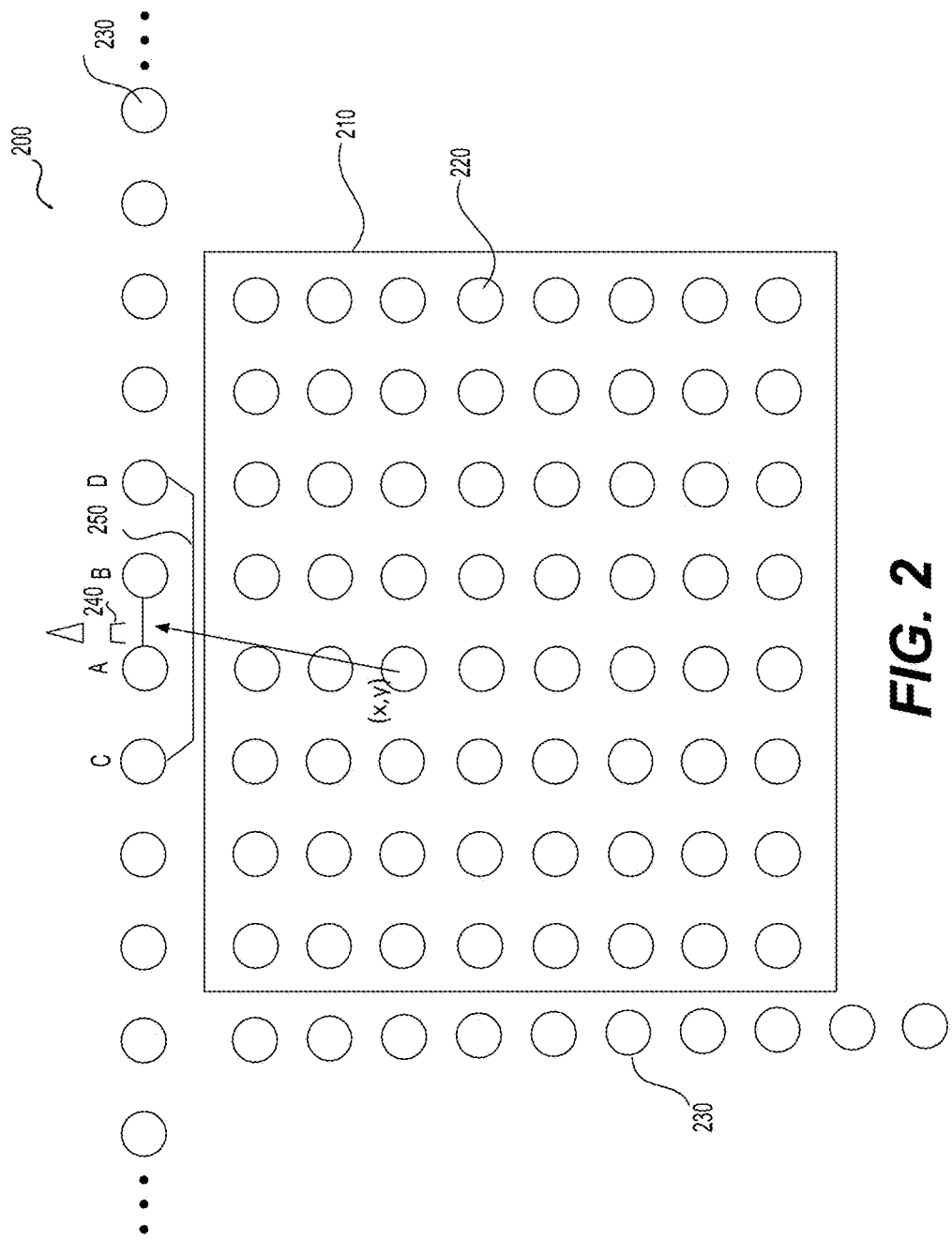
FIG. 2 shows a plot 200 of an intra prediction example according to an embodiment of the disclosure.

FIG. 2 shows a plot 200 of an intra prediction example according to an embodiment of the disclosure. The plot 200 shows a processing block 210 having a matrix of pixels 220. The plot 200 also shows neighboring reconstructed samples 230.

According to an aspect of the disclosure, the processing block 210 is coded or to be coded by an intra prediction mode. The prediction mode has a displacement parameter d and a projection direction associated with the prediction mode. For example, the displacement parameter d can be a 5-bit binary value that is a pixel's displacement expressed in $\frac{1}{32}$ pixel fractions of accuracy. For example, a binary value '01000' with H projection direction represents $\frac{8}{32}=\frac{1}{4}$ pixel displacement per horizontal pixel distance for example.

In an example, for a pixel at a position (x,y) (e.g., x=4, y=3), when the projection mode is vertical mode (e.g., the angular modes 18-34 in HEVC), the total displacement is calculated as a product (y×d) of the vertical position y and the displacement parameter d. Then, the position of a projection sample (i.e., a reference sample) A is determined according to Eq. 1:

$$X_A=(y\times d>>5)+x \qquad \text{Eq. 1}$$

In an example, when the interpolation filter is a 4-tap filter, other three reference samples B, C and D are determined based on the position of the sample A, as shown by 250 in FIG. 2.

In an example, the fractional displacement 240 within a pixel to the reference samples is referred to as the projection phase Δ. The projection phase Δ can be calculated according to Eq. 2:

$$\Delta=(y\times d)\&31 \qquad \text{Eq. 2}$$

According to an aspect of the disclosure, based on the projection phase, coefficients for an interpolation filter are determined. The coefficients can be determined based on the projection phase using any suitable technique. In an embodiment, a table of coefficients in association with projection phases is stored and the stored table is used to determine the filter coefficients based on the projection phase. An exemplary table of coefficients in association with projection phases for a 4-tap Lanczos interpolation filter is shown in FIG. 7. For example, when the projection phase has a binary value '00010', the coefficients (pc, pa, pb, pd) for the reference samples (C, A, B, D) is (−36,1015,46,−1). The prediction value P(x,y) for the pixel at positon (x,y) is calculated according to Eq. 3:

$$P(x,y)=-(pc\times C+pa\times A+pb\times B+pd\times D+512)>>10 \qquad \text{Eq. 3}$$

It is noted that the example shown in FIG. 2 and Eqs. 1-3 can be suitably modified for horizontal projection direction (e.g., the angular modes 2-17 in HEVC).

In an example, the table of coefficients can be stored in other format. For example, the table has a symmetric characteristic, thus a half of the table is stored, and the other half can be suitably determined based on the stored half of the table as shown in FIG. 8. For example, the unstored part could be derived by flipping the stored part.

Figure 3:
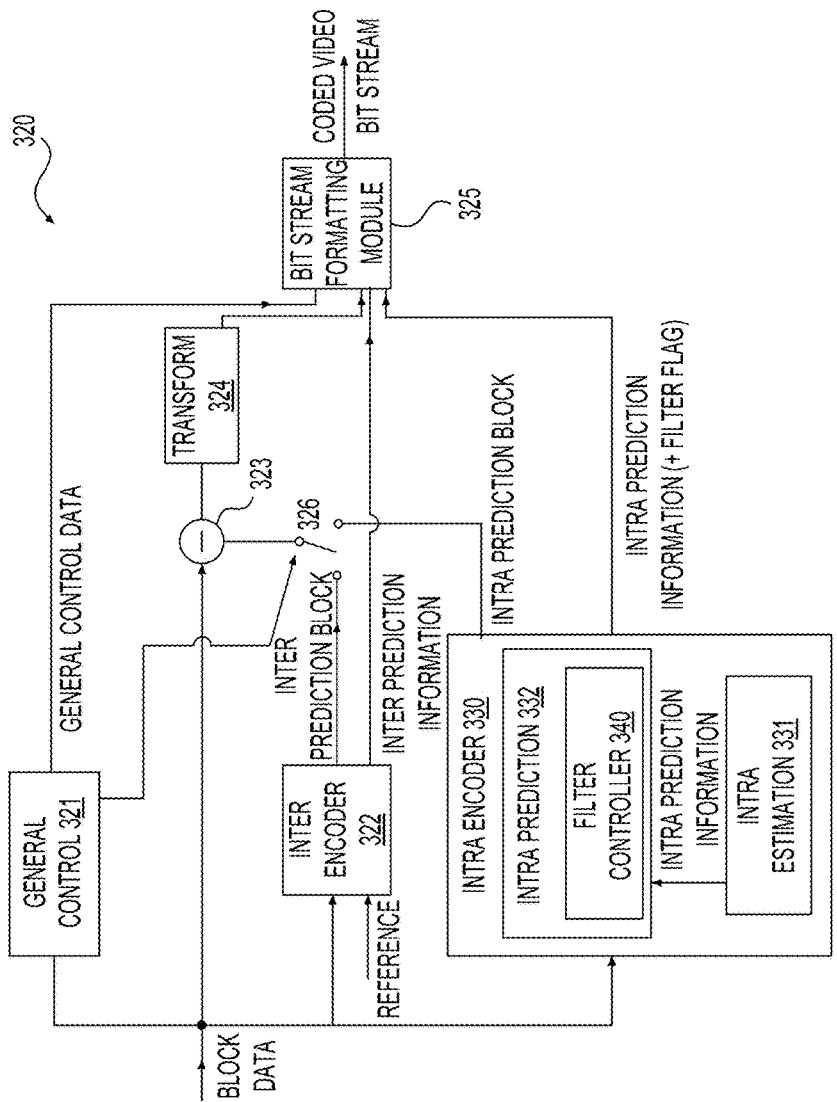
FIG. 3 shows a diagram of an encoder 320 according to an embodiment of the disclosure.

FIG. 3 shows a diagram of an encoder 320 according to an embodiment of the disclosure. The encoder 320 is configured to receive a processing block (e.g., a coding block, a prediction block) of pixel values within a picture frame in a sequence of video frames, and encode the processing block into bit stream of coded video. In an example, the encoder 320 is used in the place of the encoding circuit 120 in the FIG. 1 example. The encoder 320 includes an intra encoder 330 that varies coefficients of an interpolation filter based on projection phases.

In an HEVC example, the encoder 320 receives a matrix of pixel values for a processing block, such as a prediction block of 8×8 pixels, and the like. The encoder 320 determines whether the processing block has the intra prediction type or the inter prediction type. When the processing block has the intra prediction type, the encoder 320 uses intra prediction technique to encode the processing block into the bit stream; and when the processing block has inter prediction type, the encoder 320 uses inter prediction technique to encode the processing block into the bit stream. In an example, the encoder 320 includes other components, such as a prediction type determination module (not shown) to determine a prediction type of the processing blocks.

In the FIG. 3 example, the encoder 320 includes an inter encoder 322, the intra encoder 330, a residue calculator 323, a switch 326, a transform module 324, a general control module 321 and a bit stream formatting module 325 coupled together as shown in FIG. 3.

The inter encoder 322 is configured to receive the current block (e.g., a processing block), compare the block to a reference (e.g., blocks in previous frames), generate inter prediction information (e.g., description of redundant information according to inter encoding technique), and calculate inter prediction results based on the inter prediction information using any suitable technique.

The intra encoder 330 is configured to receive the current block (e.g., a processing block), compare the block to blocks in the same picture frame, generate intra prediction information (e.g., description of redundant information according to intra encoding technique, such as using one of 35 prediction modes), and calculate prediction results based on intra prediction information.

The general control module 321 is configured to determine general control data and control other components of the encoder 320 based on the general control data. In an example, the general control module 321 determines the prediction type of the block, and provides a control signal to the switch 326 based on the prediction type. For example, when the prediction type is the intra prediction type, the general control module 321 controls the switch 326 to select the intra prediction result for use by the residue calculator 323, and controls the bit stream formatting module 325 to select the intra prediction information and include the intra prediction information in the bit stream; and when the prediction type is the inter prediction type, the general control module 321 controls the switch 326 to select the inter prediction result for use by the residue calculator 323, and controls the bit stream formatting module 325 to select the inter prediction information and include the inter prediction information in the bit stream.

The residue calculator 323 is configured to calculate a difference (residue data) between the received block and prediction results selected from the intra encoder 330 or the inter encoder 322. The transform module 324 is configured to operate based on the residue data to encode the residue data to generate the transform coefficients. In an example, the residue data has relatively larger levels (energy) at high frequencies, and the transform module 324 is configured to convert the residue data in the frequency domain, and extract the high frequency portions for encoding to generate the transform coefficients. The transform coefficients are then subject to quantization process to obtain quantized transform coefficients.

The bit stream formatting module 325 (e.g., an entropy encoder) is configured to format the bit stream to include the encoded block. The bit stream formatting module 325 is configured to include various information according to a suitable standard, such as HEVC standard. In an example, the bit stream formatting module 325 is configured to include the general control data, the selected prediction information (e.g., intra prediction information or inter prediction information), the residue information, and other suitable information in the bit stream.

According to an aspect of the disclosure, the intra encoder 330 includes a filter controller 340 configured to determine coefficients of an interpolation filter and vary filter coefficients based on projection phases. Specifically, in the FIG. 3 example, the intra encoder 330 includes an intra estimation module 331 and an intra prediction module 332 that includes the filter controller 340. The intra estimation module 331 is configured to determine an estimation of the redundant information of the block to other pixels in the picture frame. In an example, the intra estimation module 331 selects a mode from a plurality of modes, such as 33 directional prediction modes, a DC mode and a planer mode and the like, as an estimation of the redundant information. The estimation of the redundant information and other suitable information are provided to the intra prediction module 332 as intra prediction information.

The intra prediction module 332 is configured to receive the intra prediction information, and generate intra prediction results based on the intra prediction information. In an example, each mode has an associated displacement parameter d and a projection direction (e.g., V for vertical projection direction and H for horizontal projection direction) associated with the mode. The intra prediction module 332 is then configured to calculate the intra prediction result based on the displacement parameter d and the projection direction.

During an intra prediction for encoding, in an example, neighboring reconstructed samples in the neighbor reconstructed blocks are determined and used in association with the mode of the block to predict pixels in the block. For a pixel in the current block, based on position of the pixel, the displacement parameter and the projection direction, the intra prediction module 332 determines reference samples and a projection phase (fractional pixel). Further, the filter controller 340 determines filter coefficients corresponding to the reference samples based on the projection phase. In an example, the filter controller 340 uses the projection phase as an index to search a stored table to find coefficients in association with the projection phase. Then, the interpolation filter with the determined coefficients is applied on the reference samples to predict the pixel, such as using Eq. 3. A detail example of intra prediction is described with reference to FIG. 2.

In an embodiment, the filter controller 340 is configured to select a filter from a plurality of filters, such as a set of a 2-tap Lanczos filter, a 4-tap Lanczos filter, a 6-tap Lanczos filter, a bi-linear filter, a cubic interpolation filter, a Gaussian interpolation filter and the like. Then, the filter controller 340 can determine coefficients of the selected interpolation filter based on the projection phase.

In an example, the filter controller 340 is configured to select the interpolation filter from the plurality of filters based on an intrinsic block characteristic for a partition block (e.g., a processing block, PB, CB, CTB), such as a size of the partition block, a depth of a quadtree partition associated with the processing block, a partition depth associated with the processing block, a height of a partition block, a width of a partition block, and the like. For instance, when a size of the processing block is smaller than a predetermined value, the Lanczos interpolation filter is selected by the filter controller 340. Otherwise, the Gaussian filter is selected by the filter controller 340. The size of the processing block can be indicated by the width or height of the processing block, the sum of the width and height of the processing block, the product of the width and height of the processing block, and the like. In another example, the filter controller 340 is configured to select the interpolation filter from the plurality of filters according to statistics of intra coded blocks in the current picture and one or more previous coding pictures. In yet another example, the filter controller 340 is configured to select the interpolation filter from the plurality of filters based on an availability of the selected reference samples. To be specific, when any of the reference samples are not available, the filter controller 340 can select a different interpolation filter with shorter taps to cover all available reference samples. For example, when applying the 4-tap Lanczos filter by using the reference samples (C, A, B, D) as shown in FIG. 2, if the sample D is not available, the filter controller 340 can select another filter such as a 2-tap Lanczos filter using only reference samples (A, B) to derive the prediction of the current pixel.

In another example, the filter controller 340 is configured to select the interpolation filter from the plurality of filters according other suitable parameters, and then include a filter flag that is indicative of the selected interpolation filter in the intra prediction information. In this example, the intra prediction information with the filter flag is provided to the bit stream formatting module 325 and the bit stream formatting module 325 includes the filter flag in the bit stream.

It is noted that filter flags can be included in the bit stream at various levels, such as a sequence level, a view level, a picture level, a slice level, a block level (e.g., a coding tree block level, a coding block level, a prediction block level, a transform block level), and the like.

Figure 4:
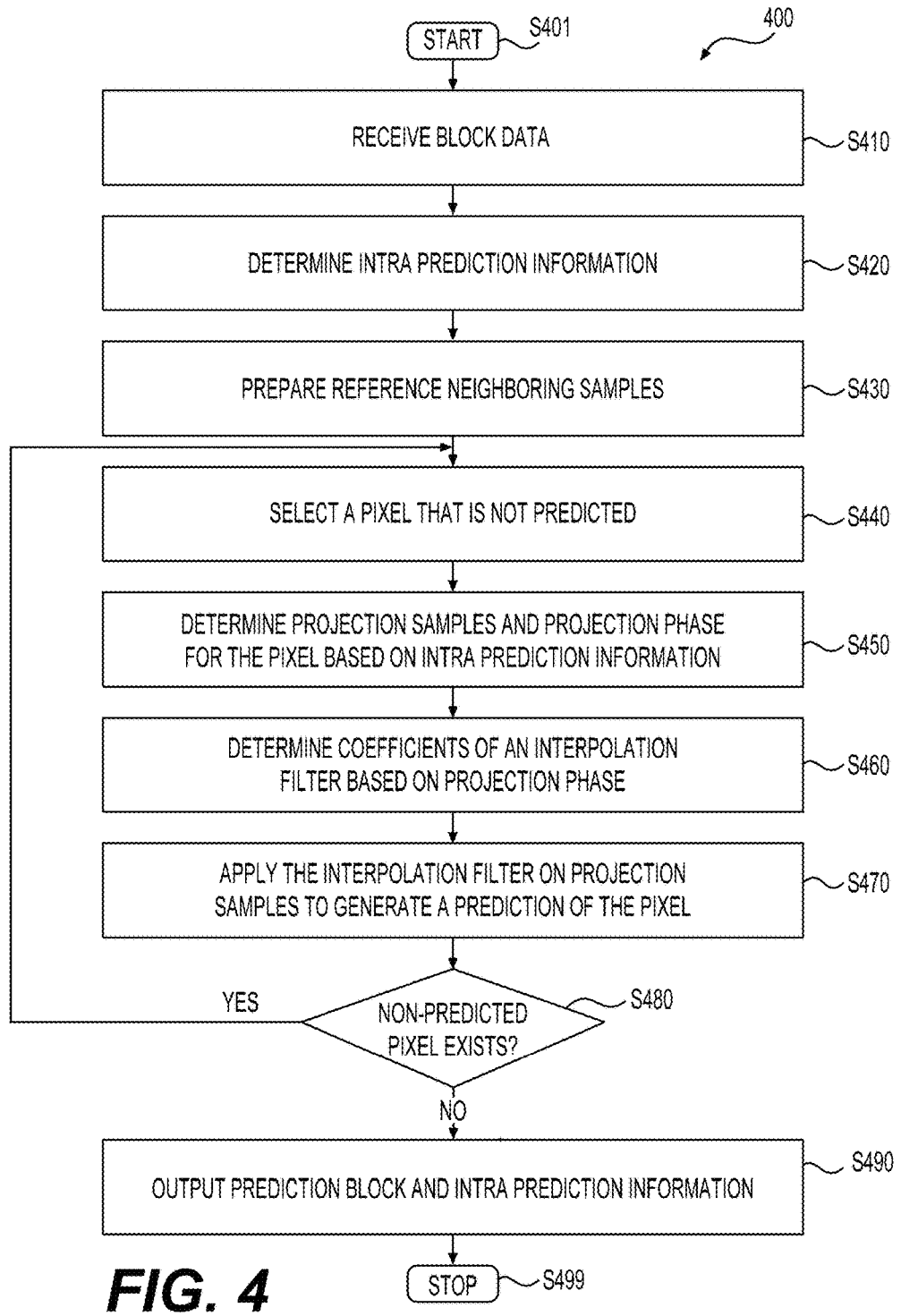
FIG. 4 shows a flow chart outlining a process 400 according to an embodiment of the disclosure.

FIG. 4 shows a flow chart outlining a process 400 according to an embodiment of the disclosure. In an example, the process 400 is executed by an intra encoder, such as the intra encoder 130 in the FIG. 1 example, the intra encoder 330 in the FIG. 3 example and the like. The process starts at S401 and proceeds to S410.

At S410, a block of pixel data is received. In the FIG. 3 example, the intra encoder 330 receives a matrix of values for pixels of a block in a picture frame within a sequence of video frames.

At S420, intra prediction information is determined. In the FIG. 3 example, the intra estimation module 331 is configured to determine an estimation of the redundant information of the block within the picture frame. In an example, the intra estimation module 331 selects a mode from multiple modes, such as 33 directional prediction modes, a DC mode and a planer mode, as an estimation of the redundant information.

At S430, neighboring reconstructed samples are prepared. In an example, the data of the reconstructed neighbor blocks, such as neighbor blocks above the block, neighbor blocks to the left of the block and the like are buffered, and the neighboring reconstructed samples can be determined from the buffered reconstructed results of the neighbor blocks.

At S440, a pixel that has not been predicted is selected.

At S450, reference samples and a projection phase for the pixel are determined based on the intra prediction information. In the FIG. 3 example, based on position of the pixel, the displacement parameter d, the projection direction associated with the current intra prediction mode and the locations of the reference sample required by an interpolation filter, the intra prediction module 332 selects reference samples from the neighboring reconstructed samples and determines the projection phase (fractional pixel) for the current pixel, for example using Eqs. 1-2. In an example, when any of the reference samples are not available, the intra prediction module 332 in the FIG. 3 example, suitably determines alternative samples. For example, the intra prediction module 332 uses a middle value (e.g., 128 for 8 binary bits pixel data) as the alternative samples. In another example, the intra prediction module 332 uses a nearest sample to the unavailable sample as the alternative sample. In yet another example, the intra prediction module 332 calculates an average of a plurality of the nearest samples as the alternative sample. In some examples, the filter controller 340 is configured to select the interpolation filter from a plurality of filters, such as a set of a 2-tap Lanczos filter, a 4-tap Lanczos filter, a 6-tap Lanczos filter, a bi-linear filter, a cubic interpolation filter and a Gaussian interpolation filter. Then, the filter controller 340 can determine the reference samples needed by the selected interpolation filter.

At S460, coefficients of an interpolation filter are determined based on the projection phase. In an example, the filter controller 340 uses the projection phase as an index to search a stored table to find filter coefficients in association with the projection phase.

At S470, the interpolation filter is applied on the reference samples to generate a prediction of the pixel. In an example, the prediction is calculated according to Eq. 3.

At S480, when the block has non-predicted pixels, the process returns to 440, and when all the pixels in the block are predicted, the process proceeds to S490.

At S490, the prediction data associated with the processing block and the intra prediction information are output. For example, the predictions of the pixels in the block are provided to the residue module to calculate residue, and the intra prediction information is provided to the bit stream formatting module 325 to include the intra prediction information in the bit stream. In an example, when the filter controller 340 selects the filter from a plurality of filters, a filter flag that is indicative of the selected interpolation filter is provide to the bit stream formatting module 325 to include the filter flag in the bit stream. Then the process proceeds to S499 and terminates.

Figure 5:
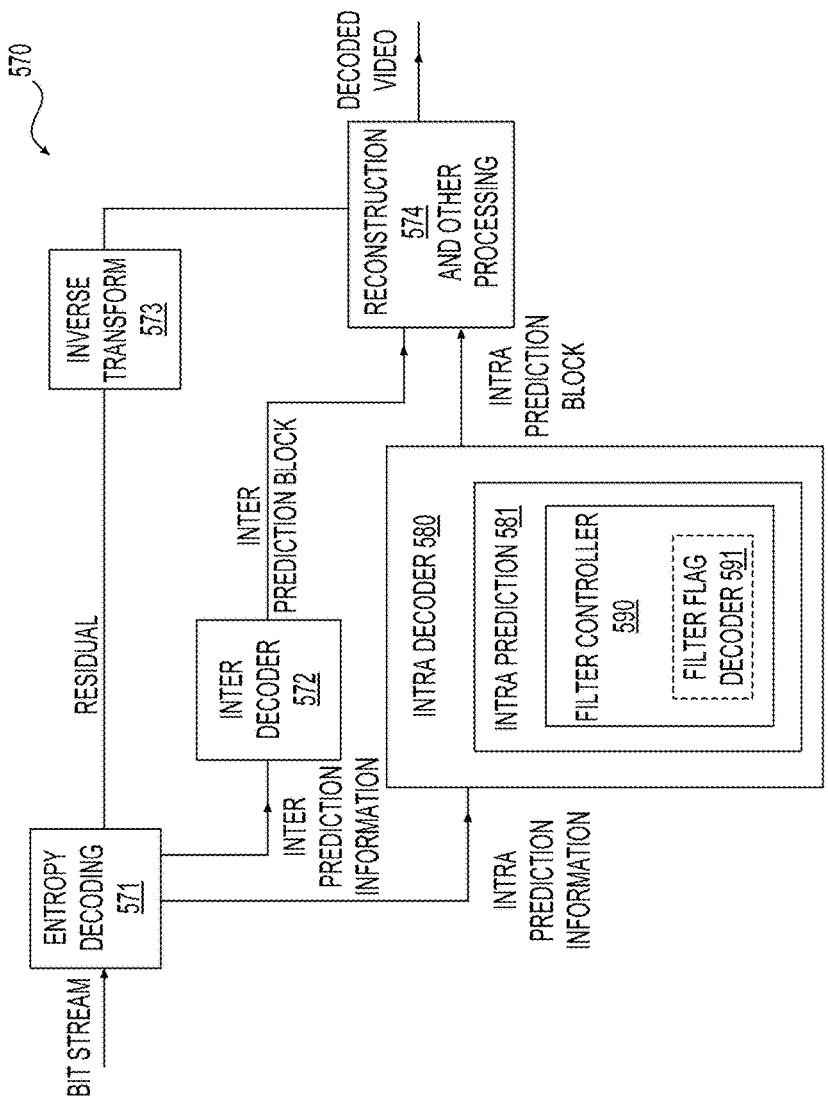
FIG. 5 shows a diagram of a decoder 570 according to an embodiment of the disclosure.

FIG. 5 shows a diagram of a decoder 570 according to an embodiment of the disclosure. The decoder 570 is configured to receive a bit stream of coded video, and decode bit stream to generate decoded video frames. In an example, the decoder 570 is used in the place of the decoding circuit 170 in the FIG. 1 example. The decoder 570 includes an intra decoder 580 that varies coefficients of an interpolation filter based on projection phases.

In the FIG. 5 example, the decoder 580 includes an entropy decoding module 571, an inter decoder 572, an inverse transform module 573, the reconstruction module 574, and the intra decoder 580 coupled together as shown in FIG. 5.

The entropy decoding module 571 is configured to determine entropy information, for example, the prediction information (intra prediction information or inter prediction information) that is an estimation of the redundant information of a processing block, the prediction type (inter prediction type or intra prediction type), the residual information, and the like. In an example, when the prediction type is the inter prediction type, the inter prediction information is provided to the inter decoder 572; and when the prediction type is the intra prediction type, the intra prediction information is provided to the intra decoder 580. The residual information is subject to inverse quantization and is provided to the inverse transform module 573.

The inter decoder 572 is configured to receive the inter prediction information, and generate inter prediction results based on the inter prediction information.

The intra decoder 580 is configured to receive the intra prediction information, and generate prediction results based on the intra prediction information.

The quantized transform coefficients are processed by an inverse quantization module, and the dequantized transform coefficients is then processed by the inverse transform module 573 to convert the residual from the frequency domain to the spatial domain.

The reconstruction module 574 is configured to combine the residual in the spatial domain and the prediction results to form decoded block, picture, and the video. It is noted that other suitable operations, such as a deblocking operation and the like, can be performed to improve the visual quality.

According to an aspect of the disclosure, the intra decoder 580 includes a filter controller 590 configured to determine coefficients of an interpolation filter and vary the coefficients based on projection phases. For example, the intra decoder 580 includes an intra prediction module 581 that includes the filter controller 590.

The intra prediction module 581 is configured to receive the intra prediction information, and generate intra prediction data based on the intra prediction information. In an example, the intra prediction information is indicative of a mode that has a displacement parameter d and a projection direction (e.g., vertical projection direction and horizontal projection direction) associated with the mode.

During an intra prediction for decoding, in an example, neighboring reconstructed samples in the neighbor reconstructed blocks are determined and used in association with the mode of the block to predict pixels in the block. For a pixel in a processing block, based on position of the pixel, the displacement parameter and the projection direction, the intra prediction module 581 determines reference samples and a projection phase (fractional pixel). Further, the filter controller 590 determines filter coefficients corresponding to the reference samples based on the projection phase. In an example, the filter controller 590 uses the projection phase as an index to search a stored table to find coefficients in association with the projection phase. Then, the interpolation filter with the determined coefficients is applied on the reference samples to predict the pixel, such as using Eq. 3. A detail example of intra prediction is described with reference to FIG. 2.

In an embodiment, the filter controller 590 is configured to determine an interpolation filter that is used at the encoding side. Then, the filter controller 590 can determine coefficients of the interpolation filter based on the projection phase.

In an example, the filter controller 590 is configured to use the same selection criteria used at the encoding side to select a filter from a plurality of filters. For example, the filter controller 590 is configured to determine the interpolation filter based on an intrinsic block characteristic for a partition block (e.g., a processing block), such as a size of a partition block, a depth of a quadtree partition associated with the processing block, a partition depth associated with the processing block, a height of the processing block, a width of the processing block, and the like. For instance, when a height or width of the processing block is smaller than a predetermined value, the Lanczos interpolation filter is selected by the filter controller 590. Otherwise, the Gaussian filter is selected by the filter controller 590. In another example, the filter controller 590 is configured to select the interpolation filter from the plurality of filters according to statistics of intra coded blocks in the current picture and one or more previous coding pictures. In yet another example, the filter controller 590 is configured to select the interpolation filter from the plurality of filters based on an availability of the selected reference samples. To be specific, when any of the reference samples are not available, the filter controller 590 can select a different interpolation filter with shorter taps to cover all available reference samples. For example, when applying the 4-tap Lanczos filter by using the reference samples (C, A, B, D) as shown in FIG. 2, if the sample D is not available, the filter controller 590 can select another filter such as a 2-tap Lanczos filter using only reference samples (A, B) to derive the prediction of the current pixel.

In another example, the filter controller 590 is configured to select the interpolation filter according to a filter flag that is indicative of the selected interpolation filter at the encoding side. In an example, the filter flag is carried in the bit stream. The entropy decoding module 571 extracts the filter flag from the bit stream, and provides the filter flag to the intra decoder 580. In an example, the filter controller 590 includes a filter flag decoder 591 configured to determine the interpolation filter based on the filter flag. Then, the filter controller 590 can determine coefficients of the determined filter based on the projection phase.

Figure 6:
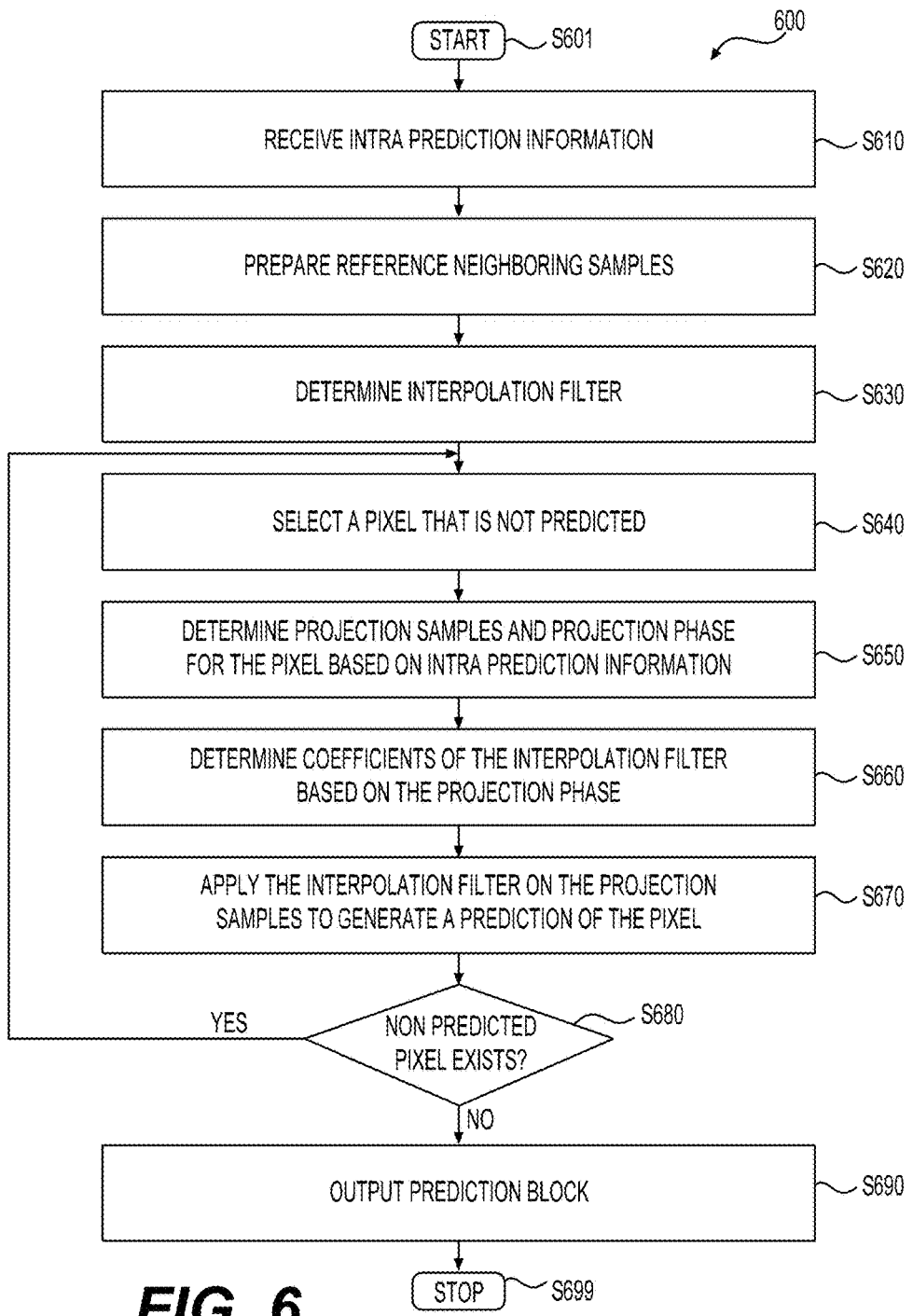
FIG. 6 shows a flow chart outlining a process 600 according to an embodiment of the disclosure.

FIG. 6 shows a flow chart outlining a process 600 according to an embodiment of the disclosure. In an example, the process 600 is executed by an intra decoder, such as the intra decoder 180 in the FIG. 1 example, the intra decoder 580 in the FIG. 5 example and the like. The process starts at S601 and proceeds to S610.

At S610, intra prediction information is received. In the FIG. 5 example, a bit stream is received by the decoder 570. The entropy decoding module 571 is configured to determine entropy information, for example, the prediction information (intra prediction information or inter prediction information) that is an estimation of the redundant information of a processing block, the prediction type (inter prediction type or intra prediction type), the residual information, and the like from the bit stream. In an example, when the prediction type is the intra prediction type, the intra prediction information is provided to the intra decoder 580. In an example, the intra prediction information is indicative of a mode that has a displacement parameter d and a projection direction associated with the mode. The residual information is subject to inverse quantization and provided to the inverse transform module 573.

At S620, neighboring reconstructed samples are prepared. In an example, the data of the neighbor reconstructed blocks, such as neighbor blocks above the block, neighbor blocks to the left of the block and the like are buffered, and the neighboring reconstructed samples can be determined from the buffer.

At S630, an interpolation filter is determined. In an embodiment, the filter controller 590 is configured to determine an interpolation filter that is used at the encoding side. In an example, the filter controller 590 is configured to use the same selection criteria used at the encoding side to select a filter from a plurality of filters. For example, the filter controller 590 is configured to determine the interpolation filter based on an intrinsic block characteristic for a partition block (e.g., a processing block), such as a size of a partition block, a depth of a quadtree partition associated with the processing block, a partition depth associated with the processing block, a height of the processing block, a width of the processing block, and the like. In another example, the filter controller 590 is configured to select the interpolation filter from the plurality of filters according to statistics of intra coded blocks in the current picture and one or more previous coding pictures. In yet another example, the filter controller 340 is configured to select the interpolation filter from the plurality of filters based on an availability of the required reference samples. For example, when any of the required reference samples are not available, the filter controller 590 can select a different interpolation filter with shorter taps, so that all of the required reference samples are available. In another example, the filter controller 590 is configured to select the interpolation filter according to a filter flag that is indicative of the selected interpolation filter at the encoding side. In an example, the filter flag is carried in the bit stream. The entropy decoding module 571 extracts the filter flag from the bit stream, and provides the filter flag to the intra decoder 580. In the example, the filter flag decoder 591 determines the interpolation filter based on the filter flag. Once the interpolation filter is determined, the locations of the reference samples required by the interpolation filter can be identified.

At S640, a pixel that has not been predicted is selected.

At S650, reference samples and a projection phase for the pixel are determined based on the intra prediction information. In the FIG. 5 example, based on position of the pixel, the displacement parameter d, the projection direction associated with the mode and the locations of the reference sample required by the interpolation filter determined at S630, the intra prediction module 581 selects reference samples from the neighboring reconstructed samples and determines the projection phase (fractional pixel) for the current pixel, for example using Eqs. 1-2. In an example, when one or more reference samples are not available, the intra prediction module 581 in the FIG. 5 example, suitably determines alternative samples. For example, the intra prediction module 581 uses a middle value (e.g., 128 for 8 binary bits pixel data) as the alternative samples. In another example, the intra prediction module 581 uses a nearest sample to the unavailable sample as the alternative sample. In another example, the intra prediction module 581 calculates an average of a plurality of the nearest samples as the alternative sample.

At S660, coefficients of the interpolation filter are determined based on the projection phase. In an example, the filter controller 590 uses the projection phase as an index to search a stored table to find filter coefficients in association with the projection phase.

At S670, the interpolation filter is applied on the reference samples to generate a prediction of the pixel. In an example, the prediction is calculated according to Eq. 3.

At S680, when the block has non-predicted pixels, the process returns to 640, and when all the pixels in the block are predicted, the process proceeds to S690.

At S690, the intra prediction result is output. For example, the predictions of the pixels in the block are provided to the reconstruction module 574 to be combined with the residual in the spatial domain. The reconstruction module 574 further constructs the decoded video frames. Then the process proceeds to S699 and terminates.

It is noted that various components and modules in the FIG. 3 and FIG. 5 examples can be implemented using any suitable technique. In an example, a module is implemented using integrated circuit. In another example, a module is implemented as a processor executing software instructions.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for video coding, comprising:
   receiving input data associated with a processing block in a current picture;
   selecting, from a set of neighboring reconstructed samples for intra-coding pixels in the processing block, a plurality of reference samples for a pixel in the processing block based on a position of the pixel and an intra prediction mode of the processing block;
   determining a projection phase for the pixel based on the position of the pixel and the intra prediction mode of the processing block;
   determining an interpolation filter based on an availability of the reference samples;
   determining coefficients of the interpolation filter based on the projection phase for the pixel;
   applying the interpolation filter with the determined coefficients on the selected reference samples to generate a prediction of the pixel; and
   encoding or decoding the pixel in the processing block using the prediction of the pixel.

2. The method of claim 1, further comprising:
   determining the interpolation filter from a plurality of filters including one or more Lanczos interpolation filters and at least one other interpolation filter.

3. The method of claim 2, wherein said one or more Lanczos interpolation filters comprises a 2-tap Lanczos filter, a 4-tap Lanczos filter, or a 6-tap Lanczos filter, and said at least one other interpolation filter comprises a bilinear filter, a cubic filter, or a Gaussian filter.

4. The method of claim 2, wherein determining the interpolation filter from the plurality of filters further comprises:
   selecting one of the plurality of filters as the interpolation filter based on at least one of a size of the processing block and a depth of a quadtree partition.

5. The method of claim 2, wherein one of said one of more Lanczos interpolation filters is selected from the plurality of filters as the interpolation filter when a height or width of the processing block is smaller than a predetermined value.

6. The method of claim 2, wherein determining the interpolation filter from the plurality of filters further comprises:
   selecting one of the plurality of filters as the interpolation filter based on a flag incorporated in a bit stream.

7. The method of claim 6, wherein the flag is transmitted in sequence, view, picture, slice, or block level.

8. The method of claim 2, wherein determining the interpolation filter from the plurality of filters further comprises:
   selecting one of the plurality of filters as the interpolation filter based on statistics of intra coded blocks in the current picture and one or more previous coding pictures.

9. The method of claim 1, further comprising:
when one of the reference samples is not available, obtaining an alternative sample to replace said one of the reference samples which is not available.

10. An apparatus, comprising:
a storage configured to store candidate coefficients; and
processing circuitry configured to:
receive input data associated with a processing block in a current picture;
select, from a set of neighboring reconstructed samples for intra-coding pixels in the processing block, a plurality of reference samples for a pixel in the processing block based on a position of the pixel and an intra prediction mode of the processing block;
determine a projection phase for the pixel based on the position of the pixel and the intra prediction mode of the processing block;
determine an interpolation filter based on an availability of the reference samples;
determine coefficients of the interpolation filter based on the candidate coefficients stored in the storage and the projection phase for the pixel;
apply the interpolation filter with the determined coefficients on the selected reference samples to generate a prediction of the pixel; and
encode/decode the pixel in the processing block using the prediction of the pixel.

11. The apparatus of claim 10, wherein the processing circuitry is configured to:
determine the interpolation filter from a plurality of filters including one or more Lanczos interpolation filters and at least one other interpolation filter.

12. The apparatus of claim 11, wherein said one or more Lanczos interpolation filters comprises a 2-tap Lanczos filter, a 4-tap Lanczos filter, or a 6-tap Lanczos filter, and said at least one other interpolation filter comprises a bi-linear filter, a cubic filter, or a Gaussian filter.

13. The apparatus of claim 11, wherein the processing circuitry is configured to:
select one of the plurality of filters as the interpolation filter based on at least one of a size of the processing block and a depth of a quadtree partition.

14. The apparatus of claim 11, wherein the processing circuitry is configured to:
select one of said one or more Lanczos interpolation filters from the plurality of filters as the interpolation filter when a height or width of the processing block is smaller than a predetermined value.

15. The apparatus of claim 11, wherein the processing circuitry is configured to:
select one of the plurality of filters as the interpolation filter based on a flag incorporated in a bit stream.

16. The apparatus of claim 15, wherein the processing circuitry is configured to:
receive the flag that is transmitted in sequence, view, picture, slice, or block level.

17. The apparatus of claim 11, wherein the processing circuitry is configured to:
select one of the plurality of filters as the interpolation filter based on statistics of intra coded blocks in the current picture and one or more previous coding pictures.

18. The apparatus of claim 10, wherein the processing circuitry is configured to:
when one of the reference samples is not available, obtain an alternative sample to replace said one of the reference samples which is not available.

* * * * *